United States Patent [19]

Pandolfi

[11] Patent Number: 4,994,823
[45] Date of Patent: Feb. 19, 1991

[54] COLOR STRIPING THERMAL PRINTER

[75] Inventor: Richard Pandolfi, Smithtown, N.Y.

[73] Assignee: Miltope Corporation, Melville, N.Y.

[21] Appl. No.: 550,120

[22] Filed: Jul. 9, 1990

[51] Int. Cl.$^5$ .......................... B41J 2/32; B41J 2/005
[52] U.S. Cl. .............................. 346/76 R; 346/140 R; 346/46; 346/23
[58] Field of Search ................. 346/76 R, 76 PH, 23, 346/46, 140 A, 140 R

[56] References Cited

U.S. PATENT DOCUMENTS

| | | | |
|---|---|---|---|
| 3,730,975 | 5/1973 | Kono et al. | 178/5.28 |
| 4,216,478 | 8/1980 | Giedd et al. | 346/61 |
| 4,495,507 | 1/1985 | Moriguchi et al. | 346/76 PH |
| 4,806,954 | 2/1989 | Niemeyer, III | 346/139 R |

Primary Examiner—Bruce A. Reynolds
Assistant Examiner—Victor DeVito
Attorney, Agent, or Firm—Whitham & Marhoefer

[57] ABSTRACT

A thermal document printer uses a row of rolling-ball ink dispensers to produce a color stripe on the thermally sensitive surface of the document.

6 Claims, 1 Drawing Sheet

COLOR STRIPING THERMAL PRINTER

DESCRIPTION

BACKGROUND OF THE INVENTION

1. Field of the Invention

The present invention generally relates to recording information in the form of color bands on documents, and more particularly to a thermal printer in which color coded bands are recorded on the thermally sensitive coating on the document.

2. Description of the Prior Art

Airline boarding documents are today commonly printed on a thermally sensitive surface by means of a thermal printing head. The boarding document, which is made of a relatively stiff paper stock, is transported at a relatively high speed past the printing head. The thermal printing head prints monochromatic (usually black) characters on the relatively white thermally responsive surface.

While altogether satisfactory for printing alphanumeric information on the boarding document, a thermal print head is not readily adaptable for printing color bands on the boarding document. Such bands are desirable to readily indicate a class of service for which the boarding pass is valid; i.e., first class, business class, and tourist class.

The thermally sensitive surface of the boarding document is relatively impervious and does not accept ink readily. Prior art attempts to print color stripes on the document as it is transported past the thermal print head resulted in unacceptable smearing. Further, it will be appreciated that the color striping ink must flow on command substantially instantaneously, but intermittently, which presents further problems, including clogging.

SUMMARY OF THE INVENTION

It is therefore an object of the present invention to provide a thermal printing apparatus which includes means to instantaneously but intermittently produce desired color stripes on the thermally sensitive surface of an airline boarding document or other similar documents with a thermally sensitive coating.

Briefly, this invention contemplates the provision of a thermal printer which has a plurality of rolling-ball ink dispensers as ranged in a row, with adjacent balls closely spaced in a direction transverse to the path along which the document is translated. Preferably there are at least two parallel rows of rolling-ball ink dispensers, each row dispensing a different color ink. The balls in each row are spaced sufficiently close so as to produce a more or less solid appearing line, typically on the order of a quarter of an inch wide running along the length of the document in the direction of the moving stock. The rows of rolling-ball ink dispensers can be selectively moved into and out of operational position so as to produce different color stripes.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
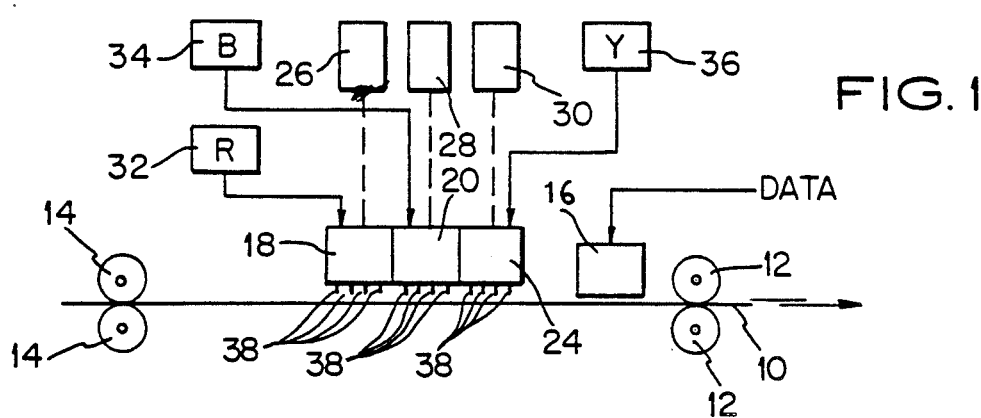
FIG. 1 is a schematic view of a thermal printer in accordance with the teachings of this invention employing three rows of rolling-ball ink dispensers.

Referring now to the drawings, and more particularly to FIG. 1, there is shown a printer for recording alphanumeric information on a document 10 with a thermally responsive coating on one surface, the upper surface as viewed in FIG. 1. A series of rollers, indicated here schematically as rollers 12 and 14, translate the document 10 in the direction of the arrow past a thermal print head 16 which records alphanumeric data by causing localized heating of the thermally sensitive surface of the document 10. It will be appreciated by the thermal printer thus far described and the thermal sensitive coating on the surface of the document 10 are entirely conventional, well understood by those skilled in the art, and in use for printing among other things, alphanumeric data on airline boarding passes.

In accordance with the teachings of this invention, three discrete rolling-ball ink dispensing units 18, 20 and 24 are disposed adjacent to the path along which the document 10 is translated. Each of the units 18, 20 and 24 is separately movable into and out of engagement with the thermally sensitive surface of document 10 by means of respective solenoids 26, 28 and 30. The solenoids are operated by a suitable command signal from a microprocessor 25 which typically responds to an input indicating the class of service for which the pass is to be issued. Ink reservoirs 32, 34 and 36 supply ink to the rolling-ball ink dispensing units at 18, 20 and 24; preferably each of the reservoirs supplies a different color ink, such as red, blue and yellow inks for example.

Figure 2:
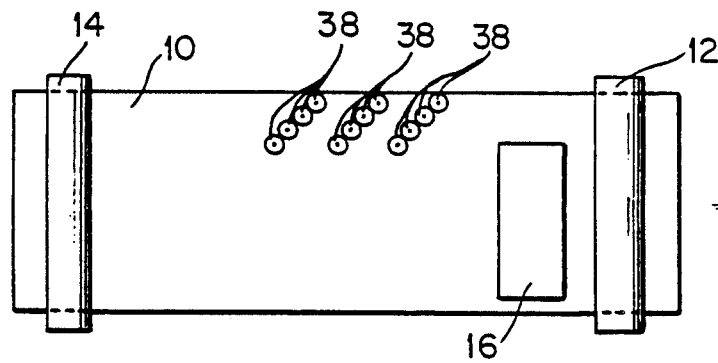
FIG. 2 is a schematic plan view of the system shown in FIG. 1, with certain parts omitted for the purposes of clarity.

As can be seen more clearly in FIG. 2, each of the units 18, 20 and 24 includes four discrete rolling-ball ink dispensing units 38. In each unit the discrete rolling-ball dispensers 38 are aligned in a row, preferably with a minimum spacing between members 38 in each row in the direction transverse to the document travel path. Since there is a certain amount of space necessary for the cartridge which supports the ink dispensing ball, the units 38 are disposed at an angle with respect to the document travel path. It will be appreciated that each rolling-ball ink dispensing unit 38 may comprise a suitable commercially available ballpoint pen. If desired, a continuous color band can be formed on the thermally sensitive surface of the document 10 by sufficiently canting the row of pens relative to the direction of document travel. Further, if desired, the pens 38 in one unit may be offset slightly with respect to the pens in the other units. Further, if two or three units are used simultaneously a wide range of colors is possible.

Figure 3:
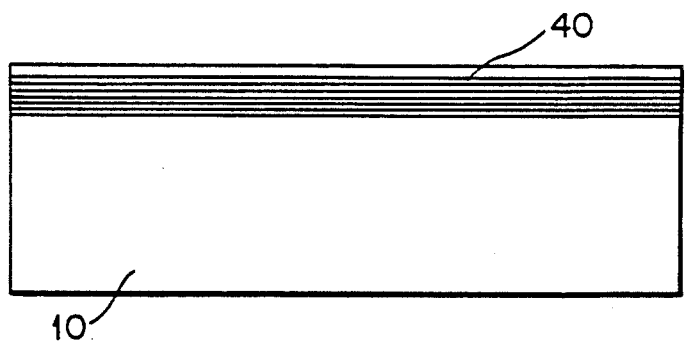
FIG. 3 is a view of the thermal sensitive surface of a typical document, showing an exemplary color-coded stripe formed thereon in accordance with the teachings of this invention.

FIG. 3 shows a typical document with a color stripe 40 along the length of document 10.

Figure 4:
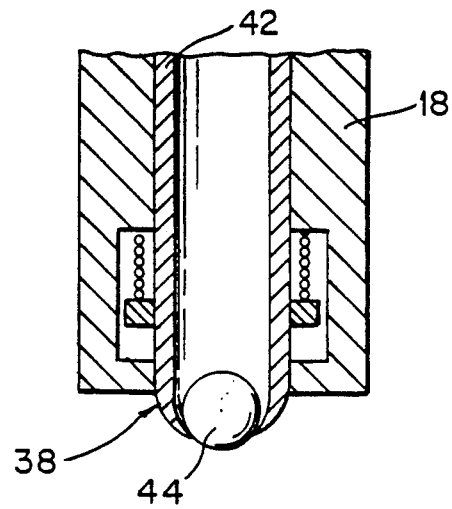
FIG. 4 is a partial sectional view of a typical rolling-ball ink dispenser of the type useful in the practice of this invention.

Referring now to FIG. 4, as mentioned above, the rolling-ball ink dispensing units 38 preferably comprise a commercially available unit typically referred to as a ballpoint pen. The pen barrel 42 which supports the rolling-ball 44 is spring-loaded in the movable housing unit such as housing unit 18. The ink reservoirs provide a reservoir which feeds ink to the pen barrel of 42. It will be appreciated that the ball 44 provides a seal which prevents clogging despite intermittent use, and yet allows substantial instantaneous marking when the ball is brought into contact with the thermally sensitive surface of the document 10. Applicant has determined empirically that commercially available color inks used in ballpoint pens dry sufficiently rapidly on the thermally sensitive coating so that the color band does not smear as the document is translated through the printer. Further, applicant has determined that these inks, when dry, hold fast to the thermally sensitive coating.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A printer for thermally sensitive paper comprising in combination:
   (a) a thermal printing head;
   (b) means for moving a document with a thermally sensitive coating on at least one of its surfaces along a predetermined path past said printing head;
   (c) a plurality of rolling-ball ink dispensers, arranged in a row with adjacent balls closely spaced in a direction transverse to said path;
   (d) means to selectively move said row of ink dispensers into and out of engagement with the thermally sensitive coating on a document traveling along said path, whereby said ink dispensers produce an ink band on said thermally sensitive paper when moved into engagement therewith.

2. A printer for thermally sensitive paper as in claim 1 wherein said row is canted with respect to said path.

3. A printer for thermally sensitive paper comprising in combination:
   (a) a thermal printing head;
   (b) means for moving a document with a thermally sensitive coating on at least one of its surfaces along a predetermined path past said printing head;
   (c) a first plurality of rolling-ball ink dispensers, arranged in a first row with adjacent balls closely spaced in a direction transverse to said path;
   (d) a first means for selectively move said first row of ink dispensers into and out of engagement with the thermally sensitive coating on a document traveling along said path, whereby said first plurality of ink dispensers produce an ink band on said card when moved into engagement therewith;
   (e) a second plurality of rolling-ball ink dispensers, arranged in a second row with adjacent balls closely spaced in a direction transverse to said path; and
   (f) a second means to selectively move said second row of ink dispensers into and out of engagement with the thermally sensitive coating on a document traveling along said path, whereby said second plurality of ink dispensers produce an ink band on said card when moved into engagement therewith.

4. A printer for thermally sensitive paper as in claim 3 wherein each of said rows is canted with respect to said path.

5. A printer for thermally sensitive paper as in claim 3 wherein said rolling-ball ink dispensers in said first and second rows, respectively, dispense ink of different colors.

6. A printer for thermally sensitive paper as in claim 4 wherein said rolling-ball ink dispensers in said first and second rows respectively dispense ink of different colors.

* * * * *

UNITED STATES PATENT AND TRADEMARK OFFICE
CERTIFICATE OF CORRECTION

PATENT NO. : 4,994,823
DATED : February 19, 1991
INVENTOR(S) : Richard Pandolfi

It is certified that error appears in the above—identified patent and that said Letters Patent is hereby corrected as shown below:

Column 4, line 10, change "for" to "to".

Signed and Sealed this

Thirtieth Day of June, 1992

*Attest:*

DOUGLAS B. COMER

*Attesting Officer*   *Acting Commissioner of Patents and Trademarks*